(12) United States Patent
Carlson

(10) Patent No.: US 7,305,939 B2
(45) Date of Patent: Dec. 11, 2007

(54) ADDITION OF FLEXIBLE FUEL ENGINE CONTROL SYSTEM

(75) Inventor: Grant B. Carlson, 12036 W. Lake Rd., P.O. Box 245, Hammondsport, NY (US) 14840

(73) Assignee: Grant B. Carlson, Hammondsport, NY (US)

( * ) Notice: Subject to any disclaimer, the term of this patent is extended or adjusted under 35 U.S.C. 154(b) by 0 days.

(21) Appl. No.: 11/379,823

(22) Filed: Apr. 24, 2006

(65) Prior Publication Data
US 2006/0236976 A1  Oct. 26, 2006

Related U.S. Application Data

(60) Provisional application No. 60/674,435, filed on Apr. 25, 2005.

(51) Int. Cl.
*F02B 3/06* (2006.01)
*F02D 19/00* (2006.01)

(52) U.S. Cl. .................. 123/27 GE; 123/526; 123/431

(58) Field of Classification Search ........... 123/27 GE, 123/525–527, 757, 304, 431, 1 A, 698, 472, 123/478, 479, 494; 701/103–105; 73/117.1
See application file for complete search history.

(56) References Cited

U.S. PATENT DOCUMENTS

| | | | |
|---|---|---|---|
| 4,594,968 A | 6/1986 | Degobert et al. | |
| 4,635,608 A | 1/1987 | Carroll | |
| 4,711,223 A | 12/1987 | Carroll | |
| 4,915,084 A | 4/1990 | Gonze | |
| 4,922,862 A | 5/1990 | Casacci | |
| 4,945,863 A | 8/1990 | Schmitz et al. | |
| 4,955,345 A | 9/1990 | Brown et al. | |
| 4,995,367 A | 2/1991 | Yamauchi et al. | |
| 5,092,305 A | 3/1992 | King | |
| 5,119,671 A | 6/1992 | Kopera | |
| 5,150,685 A | 9/1992 | Porter et al. | |
| 5,179,926 A | 1/1993 | Ament | |
| 5,263,464 A * | 11/1993 | Yoshida et al. | 123/674 |
| 5,934,255 A * | 8/1999 | Dalton et al. | 123/478 |
| 5,941,217 A | 8/1999 | Cheng et al. | |
| 6,016,796 A * | 1/2000 | Dalton | 123/695 |
| 6,990,956 B2 * | 1/2006 | Niimi | 123/406.47 |
| 2005/0273246 A1 | 12/2005 | Griese | |

FOREIGN PATENT DOCUMENTS

| | | | |
|---|---|---|---|
| GB | 2232794 | * | 12/1990 |
| JP | 113529 | * | 5/1989 |
| JP | 187845 | * | 7/1992 |
| JP | 6-288956 | * | 10/1994 |
| JP | 2003-65093 | * | 3/2003 |

\* cited by examiner

*Primary Examiner*—Hai Huynh

(57) ABSTRACT

The apparatus and method convert the fuel system of an internal combustion engine in a pre-existing (used) vehicle to operate on a mixture of fuels (like ethanol and gasoline) from a single fuel tank. The apparatus includes a fuel composition sensor installed in the fuel line and an electronic control unit with at least one fuel injector driver circuit for controlling an output signal to at least one fuel injector for controlling the air to fuel ratio of the engine. The electronic control unit controls both ignition timing and the air to fuel ratio of the engine based upon the percentage or ratio of the alternative fuel to gasoline from the fuel composition sensor. The electronic control unit receives both timing signals and fuel injector control signals from the engine's original Engine Control Module and the original emission control devices are not modified or replaced.

19 Claims, 5 Drawing Sheets

ADDITION OF FLEXIBLE FUEL ENGINE
CONTROL SYSTEM

REFERENCE TO RELATED APPLICATIONS

This application claims an invention which was disclosed in Provisional Application No. 60/674,435, filed Apr. 25, 2005. The benefit under 35 USC § 119(e) of the United States provisional application is hereby claimed, and the aforementioned application is hereby incorporated herein by reference.

FIELD OF THE INVENTION

This invention relates to the addition of a flexible fuel control system into a vehicle that is powered by an internal combustion engine. This invention relates more specifically to an apparatus and methods for converting conventionally fueled gasoline and diesel engines to operate on alternate fuels like E85, M85 and biodiesel. The addition of the flexible fuel control system converts a conventional gasoline or diesel fuel system into a flexible fuel system. A Flexible Fuel Vehicle (FFV) is created by the addition of the flexible fuel control system to the vehicle's conventional engine and fuel system.

BACKGROUND OF THE INVENTION

With the advent of alternative fuels like alcohol, biodiesel and mixed fuels like, E85 (85% ethanol and 15% gasoline) and M85 (85% methanol and 15% gasoline) there is a desire to use them in motor vehicles, motorboats and other motorized machines like trucks, tractors, lawnmowers, etc. With gasoline and diesel prices rising to record levels, alternate fuels are starting to make inroads with average American consumers. Also atmospheric pollution generated by exhaust emissions from conventional gasoline or diesel powered internal combustion engines is a well-documented problem. One method used widely today to reduce noxious emissions is to mix or even replace conventional fuels with cleaner burning alternative fuels. For example, U.S. Pat. Nos. 4,635,608 and 4,711,223 issued to Carroll teach an alcohol-fueled engine. Not only do alternate fuels burn cleaner with less harmful air pollution, the fuels can be made here at home in the United States from a variety of agricultural feedstock thereby reducing the consumption of foreign oil.

The reduction of foreign crude oil has become a topic of high priority in the US since the terrorist attacks of Sep. 11, 2001. Increase consumption of crude oil by Third World countries and the war in Iraq and further instability in the Middle East have contributed to a weak supply of crude and thus the recent rise in gasoline prices. The number of total vehicles on the planet today is estimated to be around 500 million, most of which are in the USA. By 2050 it is estimated that there will be over 3 billion vehicles and most of that increase will be in Asia and in particular China. It is reasonable to expect that crude oil prices will continue to rise whereby increasing the need of alternate fuels.

A motor vehicle capable of burning mixtures of gasoline and alcohol is commonly called a Flexible Fuel Vehicle (FFV). Today's commercially available FFVs typically burn any mixture from 85% ethanol or methanol to 100% gasoline. A diesel FFV can burn any mixture of diesel and biodiesel and ethanol is also known to be mixed with diesel. The operation of a FFV is well known and taught in a number of patents. U.S. Pat. No. 4,945,863 issued to Schmitz, et al. for example, describes a fuel-burning engine, which uses a mixed fuel containing alcohol from a single reservoir or tank. The fuel to alcohol ratio is measured using a sensor and the result is used to control the quantity of fuel being fed into the engine. U.S. Pat. No. 4,995,367 issued to Yamauchi et al. discloses a system for controlling both fuel injection and timing in an internal combustion engine operating on a fuel mixture of gasoline and methanol.

Controlling the quantity of fuel is necessary because alcohol fuels like ethanol and methanol have less energy per unit volume than gasoline or diesel and require a much smaller air to fuel ratio when burned in an internal combustion engine. While gasoline has an ideal air to fuel ratio of 14.7 to 1, pure ethanol has a ratio of about 9 to 1. The proper required air to fuel ratio is commonly referred to as stoichiometric. A fuel injection system in a FFV instantly compensates to maintain stoichiometric over wide percentage changes in the fuel mix. Therefore the principal advantage of a FFV is its ability to arbitrarily be refueled both with pure fuels and mixed fuels. This type of refueling is important because in early 2005 only about 200 service stations in 22 States in the US currently dispense mixed fuels like E85.

Some electronic fuel injection systems used in FFVs incorporate the use of a fuel composition sensor in combination with an Engine Controller Module (ECM). There are several different types of fuel composition sensors. One such sensor, an infrared sensor, is disclosed in U.S. Pat. No. 4,594,968 issued to Degobert et al. Another is a capacitive sensor taught in U.S. Pat. No. 4,915,084 issued to Eugene V. Gonze. Fuel composition sensors provide information to the ECM about the concentration of alternate fuel in the fuel mixture. Generally, fuel composition sensors provide a signal that is directly related to the percentage of alternate fuel in the fuel mixture. From that information the ECM calculates the suitable air to fuel ratio need for proper combustion. The ECM typically regulates the air to fuel mixture by controlling the amount of fuel being injected into the intake system of the engine for any given mass of air.

In the late 1990s, automotive manufactures began producing FFVs. The motivating force behind the emergence of FFVs was Federal energy legislation directed by the EPA. The demand for FFVs over the past 5 years has been rather small with the largest consumer being Federal and State governments. FFVs are currently available from six different automotive manufacturers but in just a few models. This year for example the Ford Motor Company manufactures only the Ford Taurus sedan and the Ford Explorer SUV with a FFV option. Even though FFVs make up a small percentage of vehicle sales there is a growing need for FFVs. The need is being driven mostly by the rise in crude oil prices and the desire for reduced exhaust emissions. Since there are only a few vehicle models made as FFVs, there is growing need to modify previously manufactured vehicles like classic cars, trucks and SUVs to make them fuel flexible. Classic cars and modern sports cars with high compression engines typically get poor gas mileage, have high levels of emissions and will additionally benefit from the high octane of alcohol based alternate fuels.

Therefore there is a need to convert conventional gasoline and diesel burning vehicles already being used on the highways today into Flexible Fuel Vehicles. Since these vehicles were not manufactured to operate on alternate fuels the addition of a flexible fuel engine control system is needed. In the case of a classic car using a carburetor, one method would be to replace the carburetor system with a complete flexible fuel injection system including components like, fuel injectors, sensors and an ECM. Another method would be to add a supplemental flexible fuel injection system to the engine in combination with the carburetor. For modern vehicles manufactured with Electronic Fuel Injection (EFI) it would be preferred to avoid redundancy and add or replace only the essential components for flexible fuel control.

Another complicating factor to converting any modern vehicle's fuel system is the costs and delays associated in obtaining EPA approvals. Federal law prohibits changes to a vehicle that would have an effect upon its exhaust emissions. Modifying a vehicle's fuel system generally requires an EPA or CARB approval on the modified engine. With few OEM models made available as FFVs there is a need to convert older vehicles into FFVs and in such a way to reduce the costs associated with EPA approvals for those vehicles.

SUMMARY OF THE INVENTION

The problem is solved by adding a flexible fuel engine control system to a traditional gasoline or diesel fuel injected vehicle where the control system does not replace but instead supplements the stock OEM ECM and does not bypass or modify any of the vehicle's original pollution control devices. The major components of the flexible fuel control system are a flexible fuel controller module, an ignition control circuit, a fuel composition sensor and at least one fuel injector driver for controlling at least one fuel injector. The flexible fuel controller conditions the injector driver outputs of the OEM ECM and modifies their electrical signal based upon the input received by the fuel composition sensor. The flexible fuel controller then sends the modified signal via its own fuel injector drivers on to the vehicle's fuel injectors. In this manner the fuel injector pulse width is modified to maintain proper stoichiometric engine operation over a wide range of fuel mixtures. The first preferred embodiment of the present invention discloses how a flexible fuel engine control system is used to modify a fuel-injected engine. The second preferred embodiment shows the addition of the flexible fuel engine control system to a vehicle that was originally manufactured with a carburetor.

A major advantage of the present invention is the reduction of air pollution and greenhouse gases associated with the converted vehicle's ability to burn alternate fuels. Costs to fuel the vehicle are also reduced, as alternate fuels are now cheaper to purchase than pure gasoline. Another major advantage is the switch to alternate fuel reduces America's dependency on foreign oil and in turn benefits US farmers and the US economy. Also, the present invention's flexible fuel engine control system can be added to any vehicle, car, boat, truck or other equipment that incorporates an internal combustion engine. The flexible fuel control system does not modify, change or replace the stock OEM pollution control devices present in the vehicle. Nor does the flexible fuel system replace or modify the vehicle's stock ECM or carburetor and thus the present invention can obtain EPA approvals with greater ease and less cost. The flexible fuel control system can be used to inexpensively convert a wide variety of Electronic Fuel Injection (EFI) systems like; Direct Injection (DI), Multi-Port Injection (MPI) and Throttle Body Injection (TBI). The present invention can also be used to convert a pre-existing vehicle that originally used a carburetor.

DETAILED DESCRIPTION OF THE INVENTION

Figure 1:
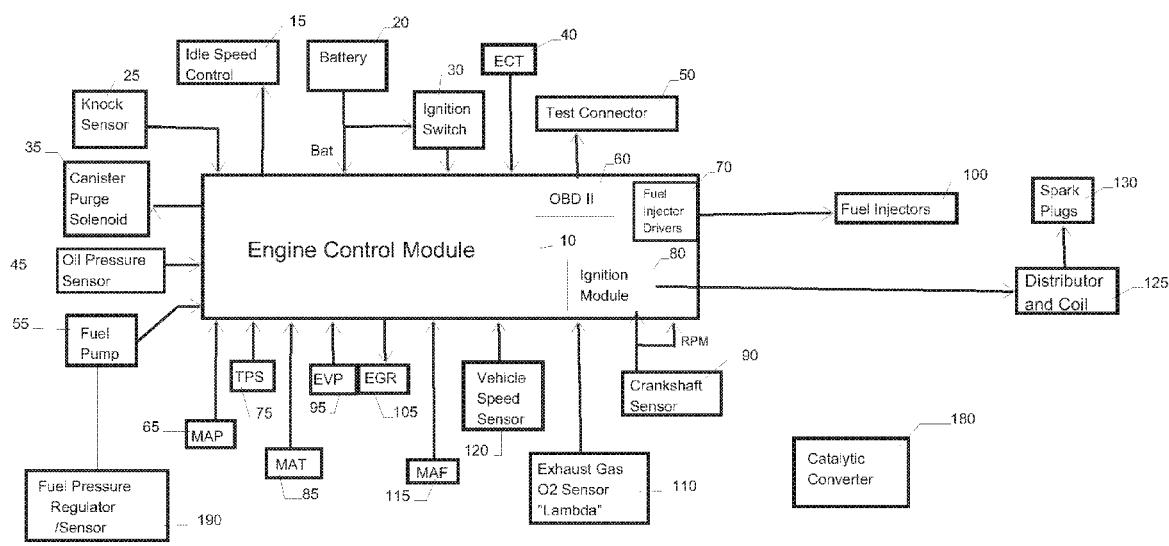
FIG. 1 shows a typical OEM Electronic Fuel Injection (EFI) system.

Referring to FIG. 1, the major components of a modern Electronic Fuel Injection (EFI) system are shown. These are common components for gasoline engines in operation today. Outside of a brief description, a detailed functional description of the system will not be taught here but rather the system is presented to form a basis for the first embodiment of the present invention shown in FIG. 2.

The heart of an EFI system is the Engine Control Module (ECM) 10. The ECM 10 typically contains a microcontroller that receives information from a variety of sensors such to control the operation of the engine. The ECM 10 controls the operation of the engine by controlling the timing of the firing of the Spark Plug(s) 130 and by metering the consumption of fuel via the Fuel Injector(s) 100. The ECM also controls other aspects primarily related to the engine's exhaust emissions. Other important parts of the system are the Fuel Pump 55 that moves fuel from the gas tank (not shown) to the engine (not shown). The Battery 20 is used to provide electrical power needed to start the engine. The Ignition Switch 30 is used to control the starting and stopping of the engine. Most EFI fuel systems use a Fuel Pressure Regulator or Sensor 190 to maintain system fuel pressure. The fuel systems are typically either return style and thus have a return fuel line to the tank or they are returnless (deadhead) style where the fuel is not returned to the gas tank.

The ECM 10 receives signals from a variety of engine sensors. Typical sensors are: Engine Coolant Temperature (ECT) Sensor 40, Knock Sensor 25, Manifold Absolute Pressure (MAP) Sensor 65, Throttle Position Sensor (TPS) 75, Manifold Air Temperature (MAT) Sensor 85, Mass Air Flow (MAF) Sensor 115, Exhaust Gas Oxygen (O2) Sensor 110, and the Crankshaft Sensor 90. Two other sensors shown in FIG. 1, Oil Pressure 45 and Vehicle Speed 120 are used for diagnostic purposes. One other sensor read by the ECM 10 is the Exhaust gas re-circulation Valve Position (EVP) Sensor 95 which lets the ECM know the Exhaust Gas Recirculation (EGR) Valve 105 is either opened or closed. The function of the EGR Valve 105 is to reduce exhaust emissions.

With ever tightening emissions standards through the 1970s and 1980s, EFI systems gained in popularity. One reason for this was the EFI systems ability to maximize the efficiencies of the Catalytic Converter 180. The Catalytic Converter 180 was first introduced in the US in 1975. EFI systems built in automobiles since 1996 additionally have On Board Diagnostics (OBD) 60. OBD 60 enables service centers an expedient way to check the operation of the components in the EFI system. Service technicians connect their diagnostic equipment to OBD via the Test Connector 50. OBD is an important feature to aid with the regulation of exhaust pollution as motor vehicle ages.

Figure 2:
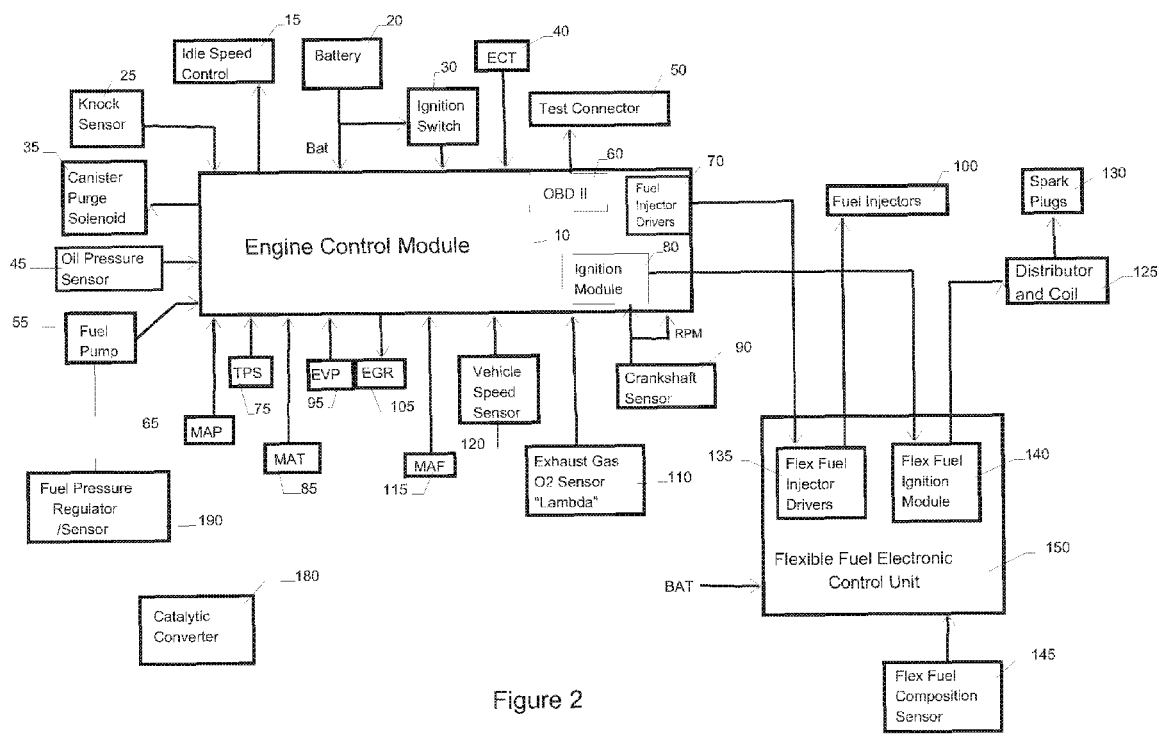
FIG. 2 shows the conversion of an OEM EFI system according to the invention.

In FIG. 2, the major components of the flexible fuel engine control system according to the present invention are shown. These components consist of the Flexible Fuel Electronic Control Unit 150, the Flexible Fuel Composition Sensor 145, the Flexible Fuel Injector Driver Circuit 135 and the Flexible Fuel Ignition Module 140. The Flexible Fuel Injector Driver Circuit 135 and the Flexible Fuel Ignition Module 140 are shown internal to the Flexible Fuel Electronic Control Unit 150 but either one or both could be external modules. The sole function of the Flexible Fuel Electronic Control Unit 150 is to control the timing of the firing of the Spark Plug(s) 130 and to meter the consumption of fuel via the Fuel Injector(s) 100 in accordance with input from the Flexible Fuel Composition Sensor 145. The Flexible Fuel Electronic Control Unit 150 receives fuel and ignition input signals from the ECM 10 and then modifies those signals based on the input from Flexible Fuel Composition Sensor 145. The Flexible Fuel Electronic Control Unit 150 sends the modified signals on to the Spark Plug(s) 130 via the Distributor 125 and on to the Fuel Injector(s) 100.

In some vehicle platforms with EFI it may be necessary to replace the OEM fuel injectors with larger capacity injectors, as higher concentrations of alternate fuels in the fuel mixture require a greater amount of fuel injected per mass of air. It is also possible that other components in the fuel system may need to be replaced. For example, the EFI Fuel Pump 55 and the fuel lines (not shown) may need to be replaced either for capacity or compatibility reasons.

The most desirable feature of flexible fuel control system of the present invention is that the system does not interfere with any of the engine's original sensors or emission control devices including OBD 60. This is important for two major reasons. One reason is the ease of EPA approval for the installation of the conversion system and the other is the lack of redundancy among component use. In total these translate into an inexpensive conversion for the consumer.

Figure 3:
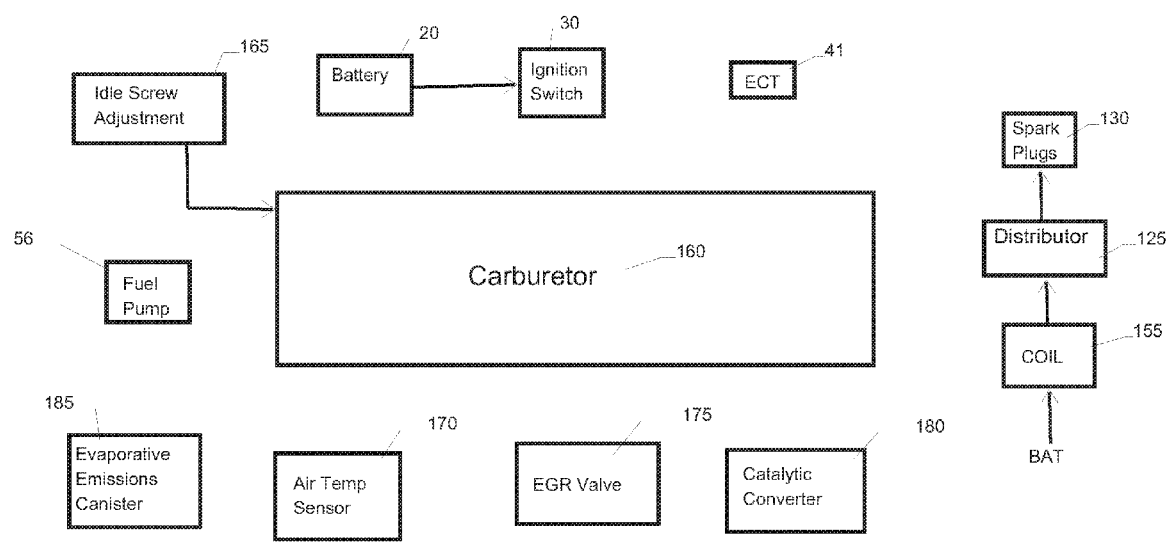
FIG. 3 shows a typical modern carburetor fuel system.

FIG. 3 refers to a typical modern carburetor fuel system found in engines prior to the advent of EFI. Although the carburetor itself is not modern, the fuel system contains modern emission control devices similar to those shown in FIG. 1. Emission control devices common to EFI and modern Carburetor systems are: EGR Valve 175, Evaporative Emissions Canister 185 and the Catalytic Converter 180. Carburetors are historically simple devices that do not require a variety of sensors to meter the fuel. Carburetor have been replaced by EFI systems as they are unable to accurately control the required air to fuel ratio commonly referred to as stoichiometric. Without being able to maintain stoichiometric, the Catalytic Converter 180 is unable to operate at its highest effectiveness to remove harmful emissions from the exhaust. Because the Carburetor 160 uses fixed jets to meter the fuel it cannot by itself properly deliver the correct amount of fuel for varying fuel mixtures like E85 or M85. Since the physical diameter of the jets needs to be changed in order to change the air to fuel ratio, the carburetor cannot by itself be used in a flexible fuel system. So the carburetor must either be replaced or supplemented with an electronic system that is fuel flexible.

Figure 4:
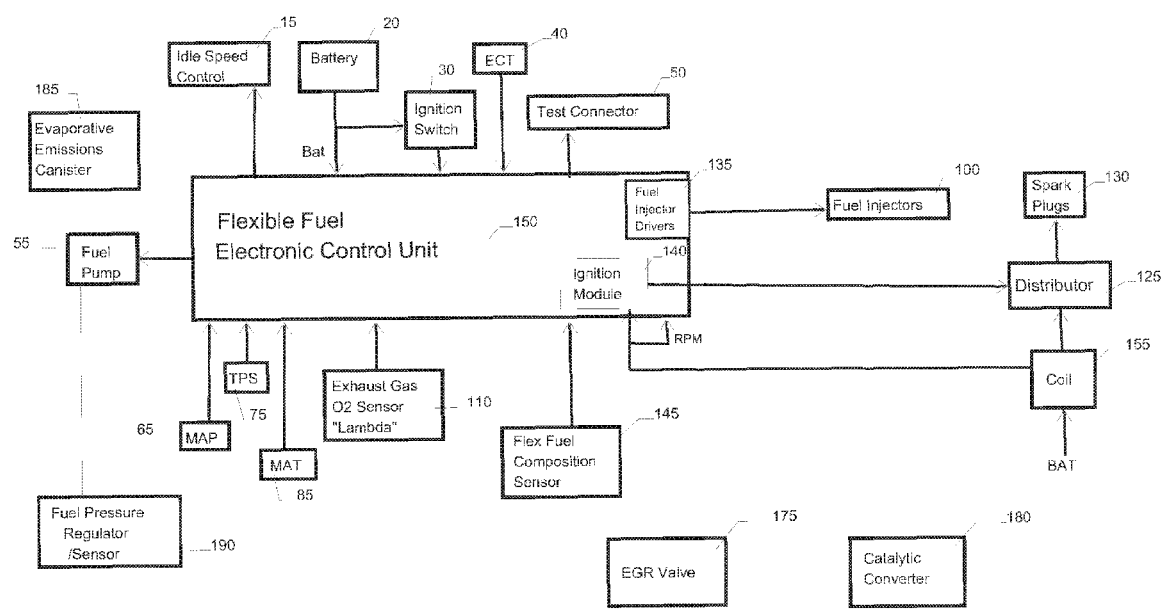
FIG. 4 shows the conversion of a carburetor fuel system according to the invention, where the carburetor is replaced.

The conversion of a carburetor system into a system that is fuel flexible can be accomplished in several different ways. One method is to remove the carburetor and install a complete EFI system with flexible fuel capability. The result of this modification is shown in FIG. 4 and the main components of the conversion are: the Flexible Fuel Control Unit 150 containing the Fuel Injector Driver(s) 135, Exhaust Gas Oxygen Sensor 110 (either narrowband or wideband type), and Ignition Module 140 and the Flexible Fuel Composition Sensor 145. In this embodiment of the present invention, the Flexible Fuel Control Unit 150 receives inputs from a variety of sensors and controls the operation of the engine. The Flexible Fuel Control Unit 150 controls the operation of the engine by controlling the timing of the firing of the Spark Plug(s) 130 and by metering fuel to the engine via the Fuel Injector(s) 100. The Flexible Fuel Control Unit 150 also controls other aspects of the engine like the ECM does in FIG. 1.

In the same spirit as the conversion shown in FIG. 2, the conversion in FIG. 4 does not modify or replace any of the emission control devices used in the carburetor system. However since the flexible fuel engine control system will operate the engine at air to fuel ratios near stoichiometric, the exhaust emissions of the converted engine will be greatly reduced. For proper operation the sensors, ECT 40, MAP 65, TPS 75, MAT 85 and the Exhaust Gas O2 Sensor 110 are added to the engine. The addition of the sensors often requires that the intake manifold of the engine be mechanically changed to allow for mounting of the sensors. Similarly the intake manifold is modified for the addition of the Fuel Injector(s) 100. The installation of the Exhaust Gas O2 Sensor 110 often requires modification to the exhaust system.

FIG. 4 also demonstrates control of the ignition timing with the Flexible Fuel Ignition Module (140). The stand-alone stock ignition system shown in FIG. 3 is however quite usable and continual usage reduces the cost of the additional components. One advantage of adding the Ignition Module 140 is the module's ability to adaptively change timing. This would allow the engine to use fuels with different octane ratings and still avoid engine knock in high compression ratio engines. Another advantage of the Ignition Module 140 is to advance timing to increase the power of the engine and thus reduce the vehicle's fuel consumption. A further use of the flexible fuel system would be in conjunction with a turbocharger or supercharger where the amount of alternate fuel in the fuel mixture would be used to determine the amount of boost the system could tolerate.

Figure 5:
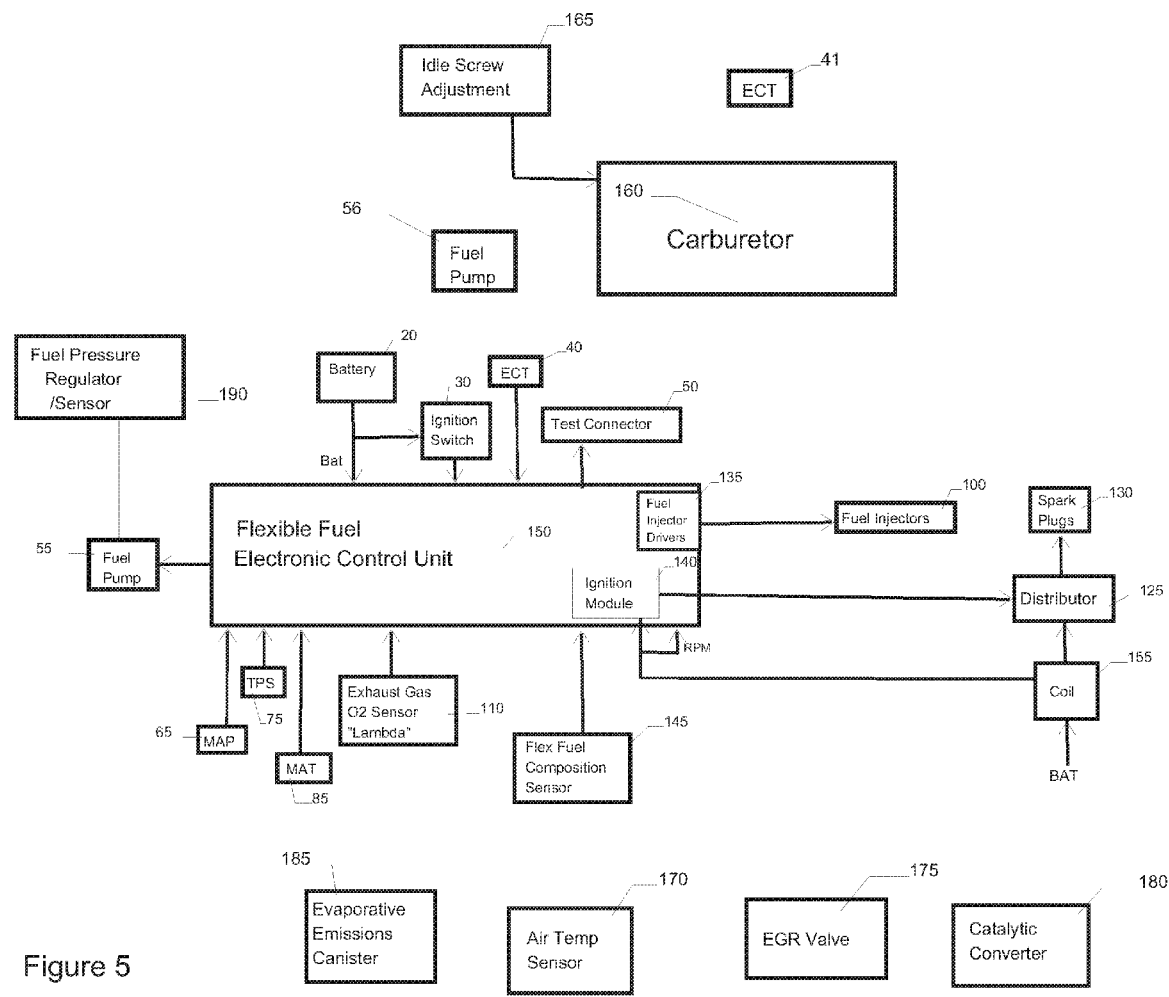
FIG. 5 shows the conversion of a carburetor fuel system according to the invention, where the carburetor is retained and functions as normal.

FIG. 5 shows an alternate method of converting a carburetor fuel system into a flexible fuel system. In this embodiment of the present invention, the Carburetor 160 is not replaced but is supplemented by the addition of the flexible fuel control system. One or more Fuel Injectors 100 are mounted about the Carburetor 160 and are controlled by the Flexible Fuel Electronic Control Unit 150. The Flexible Fuel Electronic Control Unit 150 receives a variety of sensor inputs similar to the OEM ECM in FIG. 1 and also receives input from the Flexible Fuel Composition Sensor 145 and/or an Exhaust Gas Oxygen (O2) Sensor 110 of either narrowband or wideband type.

If a significant percentage of alternate fuel is present, the Carburetor 160 will no longer be able to maintain a proper air to fuel ratio for combustion. The Flexible Fuel Electronic Control Unit 150 will sense the presence of the alternate fuel and/or its associated lean mixture and then compensate by adding fuel into the combustion process via the Fuel Injector 100. It is envisioned that the Fuel Injector 100 will typically be placed either in the air stream prior to the air entering the Carburetor 160 or be placed under the Carburetor 160 similar to the method in which Nitrous Oxide is introduced into racing engines. As a result the Carburetor 160 and the Fuel Injector 100 will work together to provide the proper amount of fuel required by the engine.

Although not shown in FIG. 5 the fuel flow from the gas tank (not shown) would normally be drawn to the Carburetor 160 by the Fuel Pump 56. The Fuel Pump 56 in most carburetor fed engines is a mechanical pump attached to the engine block and driven by the engine's camshaft. Mechanical fuel pumps are rather inexpensive when compared to EFI fuel pumps and are generally capable of supplying the additional fuel needed by the Fuel Injectors 100 but not at the appropriate pressure. Therefore the EFI Fuel Pump 55 could be fed in series by the mechanical pump 56 and used as a booster pump to provide the high pressure typically needed by the Fuel Injectors 100. The EFI Pump 55 when used in a return-less (deadhead) system could be controlled via Pulse Width Modulation (PWM) by a control circuit in the Flexible Fuel Electronic Control Unit 150. To maintain proper fuel line pressure the Flexible Fuel Electronic Control Unit 150 would monitor the Fuel Pressure Sensor 190 mounted inline with the Fuel Injectors 100 and then PWM the fuel pump to maintain the fuel pressure needed by the injectors.

The invention has been described in detail with particular reference to certain preferred embodiments thereof, but it will be understood that variations and modifications can be effected within the spirit and scope of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

PARTS LIST

10 Engine Control Module (ECM)
15 Idle Speed Control Valve or Motor
20 Battery
25 Knock Sensor
30 Ignition Switch
35 Canister Purge Solenoid
40 EFI Engine Coolant Temperature (ECT) Sensor
41 Carburetor Engine Coolant Temperature (ECT) Sensor
45 Oil Pressure Sensor
50 Test Connector
55 EFI Fuel Pump
56 Carburetor Fuel Pump
60 On-Board Diagnostics (OBD) II Module
65 Manifold Absolute Pressure (MAP) Sensor
70 Fuel Injector Driver(s)
75 Throttle Position Sensor (TPS)
80 Ignition Module
85 Manifold Air Temperature (MAT) Sensor
90 Crankshaft Sensor
95 EGR Valve Position (EVP) Sensor
100 Fuel Injector(s)
105 Exhaust Gas Recirculation (EGR) Solenoid
110 Exhaust Gas Oxygen (O2) Sensor—narrowband or wideband
115 Mass Air Flow (MAF) Sensor
120 Vehicle Speed Sensor
125 Distributor—spark generating device
130 Spark Plug(s)
135 Flexible Fuel Injector Driver(s)
140 Flexible Fuel Ignition Module
145 Flexible Fuel Composition Sensor
150 Flexible Fuel Electronic Control Unit
155 Ignition Coil
160 Carburetor
165 Idle Adjustment Screw
170 Air Temperature Sensor
175 EGR Valve
180 Catalytic Converter
185 Evaporative Emissions Canister
190 Fuel Pressure Regulator Sensor

What is claimed is:

1. An apparatus converting an OEM type of fuel system of an OEM type engine using an OEM recommended fuel fed to the engine from an OEM type fuel tank, the apparatus comprising:
    an alternative fuel mixed with the OEM recommended fuel in the OEM type fuel tank;
    a fuel composition sensor added to the OEM type fuel system to detect a proportional amount of the alternate fuel in the OEM type fuel tank;
    at least one fuel injector driver circuit controlling an output signal to at least one fuel injector that meters an amount of the mixed fuel delivered to the OEM type engine from the OEM type fuel tank;
    an electronic control unit containing said fuel injector driver circuit added to the OEM type fuel system and arranged to receive an input from the fuel composition sensor; and
    the electronic control unit being arranged to change the output signal from the fuel injector driver circuit to the fuel injector to vary the amount of the fuel metered into the OEM type engine to maintain a correct air-to-fuel ratio needed for proper combustion of the mixed fuel from the OEM type tank.

2. The apparatus of claim 1, wherein the engine being convened is a conventional gasoline or diesel internal combustion engine.

3. The apparatus of claim 1, wherein the engine is installed into a previously manufactured motor vehicle, motorboat, truck, tractor, lawnmower or other equipment with an engine.

4. The apparatus of claim 1, wherein the fuel composition sensor is arranged in a fuel supply line upstream of said fuel injector.

5. The apparatus of claim 1 wherein the alternative fuel is ethanol, methanol or biodiesel.

6. The apparatus of claim 1, wherein said fuel injector driver circuit is located in said electronic control unit.

7. The apparatus of claim 1, further including an ignition control circuit controlling ignition timing of the engine based upon the proportion of said alternative fuel in said fuel mixture.

8. The apparatus of claim 7, wherein the ignition control circuit receives an ignition timing signal from the ECM.

9. The apparatus of claim 8 wherein said ignition timing signal received by said ignition control circuit is delayed or advanced by said ignition control circuit before being sent to a spark generating device of the engine.

10. The apparatus of claim 7, wherein said ignition control circuit is located in the said electronic control unit.

11. The apparatus of claim 1, wherein the OEM fuel system included a carburetor.

12. The apparatus according to claim 11 wherein said fuel composition sensor comprises a wideband oxygen sensor to determine the proportion of said alternative fuel in the fuel mixture.

13. The apparatus according to claim 11, wherein the carburetor remains in the fuel system and meters fuel as if the fuel were not a mixed fuel.

14. The apparatus according to claim 13 wherein the said fuel injector is placed relative to the carburetor to provide additional fuel as commanded by the said electronic control unit.

15. The apparatus according to claim 14 wherein the electronic control unit receives from said fuel composition sensor an input representing the proportion of said alternative fuel in the mixture and changes the output signal to the fuel injector driver circuit to control said fuel injector to vary an additional amount of fuel metered into said engine to maintain a correct air-to-fuel ratio needed for proper engine combustion.

16. The apparatus according to claim 15 wherein the fuel composition sensor includes a wideband oxygen sensor to determine the proportion of said alternative fuel in the fuel mixture.

17. The apparatus in claim 11, further including an ignition control circuit controlling ignition timing of the engine based upon the proportion of said alternative fuel in the mixture, wherein the ignition control circuit receives at least one ignition timing signal from a distributor of the engine.

18. The apparatus according to claim 17 wherein said ignition timing signal received by the said ignition control circuit is delayed or advanced by said ignition control circuit before being sent back to the engine's distributor.

19. The apparatus in claim 11, wherein the said fuel injectors are fed by a fuel pump that is fed by a fuel pump for the carburetor.

* * * * *